United States Patent
Yan et al.

(10) Patent No.: US 11,326,713 B2
(45) Date of Patent: May 10, 2022

(54) ACTUATOR ASSEMBLY FOR A FLUID CONTROL DEVICE

(71) Applicant: FISHER JEON GAS EQUIPMENT (CHENGDU) CO., LTD., Chengdu (CN)

(72) Inventors: Jian Yan, Chengdu (CN); Yanwei Lei, Chengdu (CN); Yanbo Shi, Chengdu (CN); Jie Yuan, Chengdu (CN)

(73) Assignee: FISHER JEON GAS EQUIPMENT (CHENGDU) CO., LTD., Chengdu (CN)

( * ) Notice: Subject to any disclaimer, the term of this patent is extended or adjusted under 35 U.S.C. 154(b) by 13 days.

(21) Appl. No.: 16/906,624

(22) Filed: Jun. 19, 2020

(65) Prior Publication Data
US 2020/0408329 A1    Dec. 31, 2020

(30) Foreign Application Priority Data

Jun. 28, 2019  (CN) .......................... 201910573733.7
Jun. 28, 2019  (CN) .......................... 201921003620.5

(51) Int. Cl.
*F16K 31/60*  (2006.01)
*F16K 31/53*  (2006.01)
(Continued)

(52) U.S. Cl.
CPC ............... *F16K 31/53* (2013.01); *F16H 1/28* (2013.01); *F16K 31/60* (2013.01); *F16K 35/06* (2013.01)

(58) Field of Classification Search
CPC ......... Y10T 137/3367; Y10T 137/3421; F16K 1/12; F16K 31/53; F16K 31/56; F16K 31/60; F16K 35/06; F16H 1/28
(Continued)

(56) References Cited

U.S. PATENT DOCUMENTS 2,025,244 A * 12/1935 Morehead ............. F16K 31/535
                                                137/246.14
2,780,333 A *  2/1957 Reiser ................... F16K 35/025
                                                192/69.7
(Continued)

FOREIGN PATENT DOCUMENTS

CN      102177378 A      9/2011
CN      103925400 A      7/2014
(Continued)

OTHER PUBLICATIONS

International Search Report and Written Opinion for Corresponding International Application No. PCT/IB2020/000558, dated Nov. 20, 2020.

*Primary Examiner* — Matthew W Jellett
(74) *Attorney, Agent, or Firm* — Marshall, Gerstein & Borun LLP

(57) ABSTRACT

A fluid control device comprising including a body having an inlet, an outlet, and a fluid flow path between the inlet and the outlet, a seat, and a control element that is coupled to a stem. The control element and the stem are movable relative to a longitudinal axis and biased toward a closed position, in which the control element engages the seat. An actuator assembly is operatively coupled to the stem and includes a planetary gear transmission mechanism configured to receive a first rotational velocity and to deliver a second rotational velocity different than the first rotational velocity. A shaft has a first end coupled to the transmission mechanism and a second end coupled to valve stem. The second rotational velocity is transmitted to the valve stem to move the control element between the closed position and an open position.

16 Claims, 8 Drawing Sheets

(51) Int. Cl.
*F16H 1/28* (2006.01)
*F16K 35/06* (2006.01)

(58) Field of Classification Search
USPC ........ 137/219, 220; 251/128, 231, 235, 248, 251/250.5, 291, 292
See application file for complete search history.

(56) References Cited

U.S. PATENT DOCUMENTS

| | | | | |
|---|---|---|---|---|
| 2,829,538 | A * | 4/1958 | Mueller | F16K 35/027 |
| | | | | 74/548 |
| 5,178,185 | A * | 1/1993 | Stehling | F16K 15/18 |
| | | | | 137/385 |
| 5,622,201 | A * | 4/1997 | Chang | F16K 1/12 |
| | | | | 137/219 |
| 6,378,841 | B1 * | 4/2002 | Russell | F16K 5/201 |
| | | | | 251/158 |
| 7,040,339 | B2 * | 5/2006 | Istre, Jr. | F16K 1/12 |
| | | | | 137/220 |
| 7,556,239 | B2 * | 7/2009 | Beebe | F16K 5/0642 |
| | | | | 251/248 |
| 9,964,212 | B2 * | 5/2018 | Kamp | F16J 1/005 |
| 10,663,070 | B2 | 5/2020 | Jing et al. | |
| 11,078,990 | B2 * | 8/2021 | West | F16D 41/08 |
| 2005/0121635 | A1 | 6/2005 | Opper | |
| 2010/0084594 | A1 | 4/2010 | Lin et al. | |
| 2020/0240533 | A1 * | 7/2020 | Fan | F16K 37/0016 |
| 2021/0048119 | A1 * | 2/2021 | Yuan | F16K 31/60 |

FOREIGN PATENT DOCUMENTS

| | | |
|---|---|---|
| CN | 105351595 A | 2/2016 |
| CN | 107559479 A | 1/2018 |
| CN | 109723899 A | 5/2019 |
| EP | 1538379 A1 | 6/2005 |

* cited by examiner

ACTUATOR ASSEMBLY FOR A FLUID CONTROL DEVICE

TECHNICAL FIELD

The present disclosure relates to a fluid control device, and in particular, to an actuator assembly for a fluid control device.

BACKGROUND

A slam-shut valve is a type of valve that quickly actuates in the event of a detected process condition. Generally, a slam-shut valve is composed of a valve and a slam-shut trigger mechanism, which can drive a control element to quickly shut off the flow passage of the valve when the pressure at certain control points within the valve reaches a fixed set value. The slam-shut valve effectively shuts off the fluid to protect the downstream components in the system when the certain fixed set values are met. When the trip condition clears, it is necessary to manually open the valve to reset the system. However, for large operating valves, manually resetting the system can be very difficult and requires a large torque. This may be accomplished by increasing the lever arm of the handle several times to meet the requirements of the system, which increases weight of the lever and may be dangerous to an operator if the handle is reversed.

SUMMARY

An actuator assembly for an axial flow slam-shut valve is provided with a Scotch yoke mechanism and a planetary gear transmission mechanism to change the direction of movement (or the mode of transmission) to a shut-off control element for the valve.

In accordance with a first exemplary aspect, a fluid control device may include a body having an inlet, an outlet, and a fluid flow path between the inlet and the outlet, a seat, and a control element. The control element may be coupled to a stem, wherein the control element and the stem may be movable along a first axis and biased toward a closed position, in which the control element engages the seat. The fluid control device may further include an actuator assembly. The actuator assembly may include a transmission mechanism configured to receive a first rotational velocity and to deliver a second rotational velocity different than the first rotational velocity. A shaft may have a first end coupled to the transmission mechanism and a second end operatively coupled to the stem. A Scotch yoke mechanism may be operatively coupled to the stem and the transmission mechanism via the second end of shaft. The Scotch yoke mechanism may be configured to receive the second rotational velocity and cause movement of the stem and the control element along the first axis in a translational direction.

In accordance with a second exemplary aspect, a fluid control device may include a body having an inlet, an outlet, and a fluid flow path between the inlet and the outlet, a seat, and a control element that is coupled to a stem. The control element and the stem may be movable relative to a longitudinal axis and biased toward a closed position, in which the control element engages the seat. An actuator assembly may be operatively coupled to the stem. The actuator assembly may include a planetary gear transmission mechanism configured to receive a first rotational velocity and to deliver a second rotational velocity different than the first rotational velocity. A shaft may have a first end coupled to the transmission mechanism and a second end operatively coupled to valve stem. The second rotational velocity may be transmitted to the valve stem to move the control element between the closed position and an open position, in which the control element is spaced from the seat.

In accordance with a third exemplary aspect, an actuator assembly for a fluid control device may include a transmission mechanism, a Scotch yoke mechanism, and a shaft. The transmission mechanism may be configured to receive a first rotational velocity from the handle and may deliver a second rotational velocity different than the first rotational velocity. The transmission mechanism may include a sun gear, a plurality of satellites, and a plurality of satellite shafts. The sun gear may receive the first rotational velocity and may deliver the second rotational velocity to the satellite shafts via the satellites. The Scotch yoke mechanism may be operatively coupled to the stem and the transmission mechanism. The Scotch yoke mechanism may be configured to receive the second rotational velocity and cause movement of a valve stem in a translational direction. The transmission shaft may have a first end coupled to the transmission mechanism and a second end coupled to the Scotch yoke mechanism.

In accordance with a fourth exemplary aspect, a manual actuation assembly for a fluid control device may include a coupling that is configured to receive a shaft of the fluid control device, a rotatable input device, and a transmission section. The transmission section may be configured to operably couple the rotatable input device and the coupling such that rotation of the rotatable input device causes rotation of the shaft. The transmission section may include a sun gear that is configured to rotate in conjunction with rotation of the rotatable input device, and a plurality of satellite gears. Each of the plurality of satellite gears may be configured to revolve around the sun gear. The coupling may be operably coupled to the plurality of satellite gears.

In accordance with a fifth exemplary aspect, a manual actuation assembly for a fluid control device may include a rotatable handle that is operably coupled to a sun gear, a plurality of satellite gears that are configured to revolve about the sun gear, a planet carrier that is coupled to each of the plurality of satellite gears, and a coupling that is coupled to the planet carrier. The coupling may include a cavity that is configured to receive a shaft of the fluid control device. A biasing member may be positioned within the cavity to bias the shaft out of the cavity absent a force to maintain the shaft within the cavity.

In accordance with a sixth exemplary aspect, an actuator assembly for a fluid control device may include a transmission mechanism configured to receive a first rotational velocity and to deliver a second rotational velocity different than the first rotational velocity. A shaft may have a first end coupled to the transmission mechanism and a second end operatively coupled to the stem. A Scotch yoke mechanism may be operatively coupled to the stem and the transmission mechanism via the second end of shaft. The Scotch yoke mechanism may be configured to receive the second rotational velocity and cause movement of the stem and the control element along the first axis in a translational direction.

In further accordance with any one or more of the foregoing first, second, third, fourth, fifth, or sixth exemplary aspects, a fluid control device, an actuator assembly for a fluid control device, or a manual actuation assembly for a fluid control device may further include any one or more of the following preferred forms.

In a preferred form, the transmission mechanism may include a planetary gear assembly including a sun gear, a plurality of satellites, and a plurality of satellite shafts.

In a preferred form, the sun gear may receive the first rotational velocity and may deliver the second rotational velocity to the satellite shafts via the satellites.

In a preferred form, the transmission mechanism may include a ring gear fixed to a housing of the transmission mechanism.

In a preferred form, the ring gear may be operatively coupled to the plurality of satellites.

In a preferred form, the transmission mechanism may include a planet carrier coupled to the plurality of satellite shafts.

In a preferred form, the planet carrier may be operatively coupled to the shaft.

In a preferred form, the actuator assembly may include a spring-release mechanism operatively coupled to the transmission mechanism.

In a preferred form, the spring-release mechanism may include a bore sized to receive the shaft and a spring.

In a preferred form, the spring of the spring-release mechanism may be configured to bias the shaft when the shaft is coupled to the transmission mechanism.

In a preferred form, the actuator assembly may include a coupler assembly including the spring-release mechanism and a coupler coupled to the planet carrier.

In a preferred form, when the spring-release mechanism is engaged, the coupler may engage the planet carrier.

In a preferred form, the actuator assembly may include a handle that is positioned outside of the body.

In a preferred form, the handle may be operatively coupled to the transmission mechanism to deliver the first rotational velocity to the transmission mechanism.

In a preferred form, the handle may be integrally formed with the transmission mechanism.

In a preferred form, the transmission mechanism may be at least partially disposed within the valve body.

In a preferred form, the planetary gear transmission mechanism may include a sun gear, a plurality of satellites, and a plurality of satellite shafts.

In a preferred form, the sun gear may receive the first rotational velocity and may deliver the second rotational velocity to the satellite shafts via the satellites.

In a preferred form, the shaft may be operatively coupled to the sun gear via a coupler and a planet carrier.

In a preferred form, the planet carrier may be coupled to the plurality of satellite shafts at a first end and the coupler at the second end.

In a preferred form, the coupler may be sized to receive the first end of the shaft.

In a preferred form, a Scotch yoke mechanism may be operatively coupled to the stem and the planetary gear transmission mechanism via the shaft.

In a preferred form, the Scotch yoke mechanism may be configured to receive the second rotational velocity and cause movement of the stem and the control element along the longitudinal axis in a translational direction.

In a preferred form, a trigger mechanism may be responsive to fluid pressure.

In a preferred form, the trigger mechanism may prevent rotation of the shaft in a rotational direction in a first mode of operation and releases the shaft to allow rotation of the shaft in the rotational direction in a second mode of operation.

In a preferred form, a coupler assembly may include a coupler having a first end operatively coupled to the satellite shafts and a second end housing a spring-release mechanism.

In a preferred form, the spring-release mechanism may be removably coupled to the first end of the shaft.

In a preferred form, spring-release mechanism may include an expandable bushing and a spring.

In a preferred form, the spring-release mechanism may be configured to engage the shaft when the shaft is coupled to the transmission mechanism and disengage the shaft when the shaft is decoupled from the transmission mechanism.

In a preferred form, a planet carrier may be coupled to the plurality of satellite shafts and may be configured to transmit the second rotational velocity to the transmission shaft.

In a preferred form, a ring gear may be fixed to a housing of the transmission mechanism.

In a preferred form, the ring gear may be configured to engage the plurality of satellites.

In a preferred form, the transmission section may include a planet carrier that is coupled to each of the satellite gears.

In a preferred form, the planet carrier may be coupled to the coupling.

In a preferred form, the coupling may include a cavity that is configured to receive the shaft.

In a preferred form, a biasing member may be positioned within the cavity.

In a preferred form, the biasing member may be configured to decouple the coupling and the shaft when no external force is applied to maintain the shaft within the cavity.

In a preferred form, the manual actuation assembly may include a ring gear.

In a preferred form, each of the plurality of satellite gears may be engaged with the sun gear and the ring gear.

In a preferred form, a support frame may engage an exterior surface of the ring gear.

In a preferred form, the support frame may be configured to enable rotation of the input member while the ring gear is stationary.

In a preferred form, an input shaft may be coupled to the rotatable input device and to the sun gear.

In a preferred form, an input shaft that may be coupled to the rotatable handle and the sun gear.

In a preferred form, a support frame may include a bore that is configured to receive an exterior surface of the ring gear.

In a preferred form, the support frame may be configured to facilitate rotation of the rotatable handle relative to the ring gear.

In a preferred form, an output torque that is delivered at the coupling may be greater than an input torque that is delivered via rotation of the rotatable handle.

In a preferred form, a fluid actuator may include the actuator assembly and a body having an inlet, an outlet, and a fluid flow path between the inlet and the outlet.

In a preferred form, the fluid actuator may include a seat.

In a preferred form, the fluid actuator may include a control element that is coupled to a stem.

In a preferred form, the control element and the stem may be movable along a first axis and biased toward a closed position, in which the control element engages the seat.

Any one or more of these aspects may be considered separately and/or combined with each other in any functionally appropriate manner. In addition, any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

DETAILED DESCRIPTION

Figure 1:
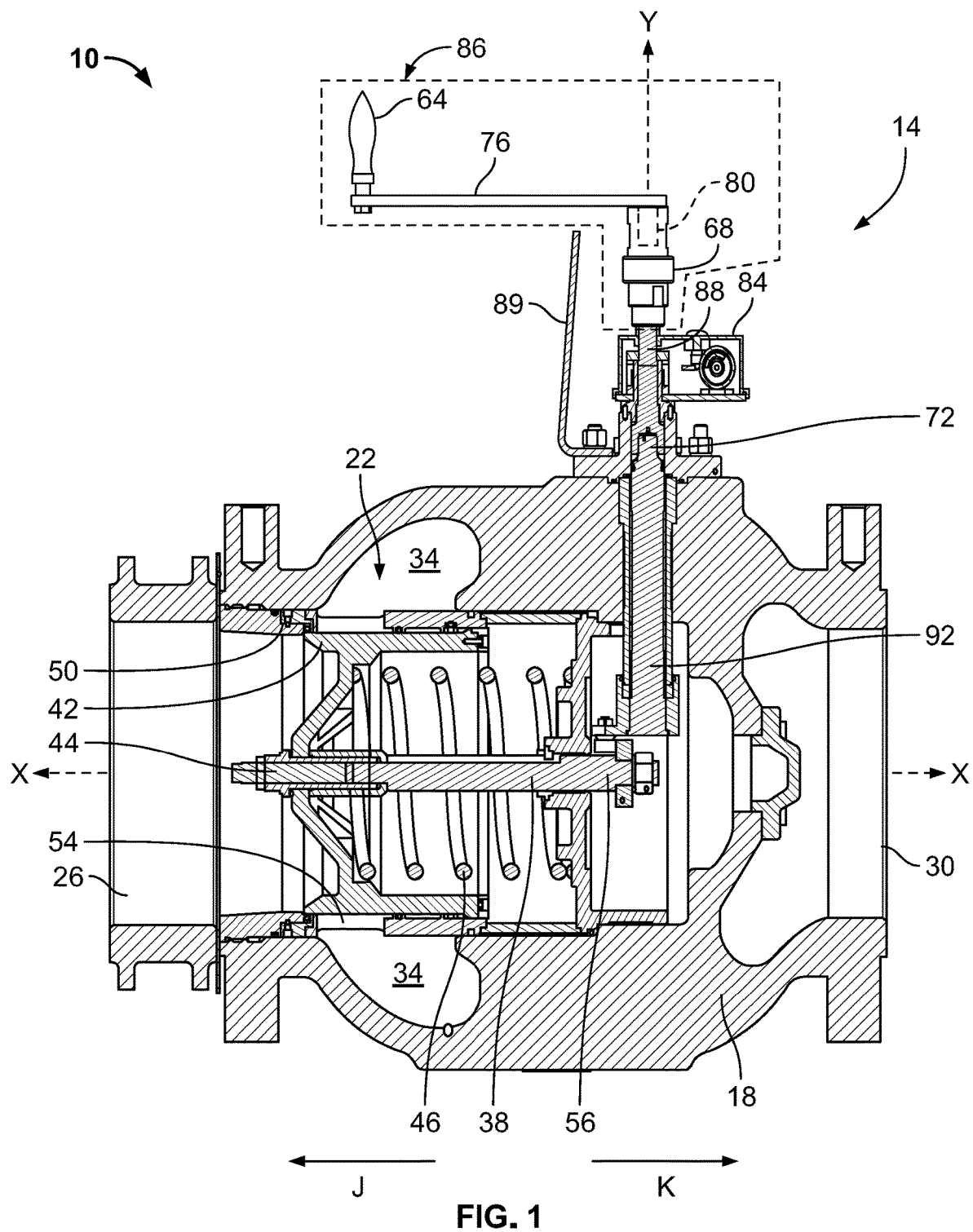
FIG. 1 is a cross-sectional side view of an axial flow slam-shut valve having an actuator assembly assembled in accordance with the teachings of the present disclosure.

In FIG. 1, an exemplary fluid control device 10 is constructed according to the teachings of the present disclosure. The fluid control device 10 is an axial flow slam-shut valve 10 and is operatively coupled to an actuator assembly 14. The axial flow slam-shut valve 10 includes a valve body 18 and a valve assembly 22 arranged in the valve body 18. The valve body 18 includes an inlet 26, an outlet 30, and a fluid flow path 34 between the inlet 26 and the outlet 30. The valve body 18 includes a longitudinal axis that is coaxially aligned with a longitudinal axis X of a valve stem 38. The flow path 34 is arranged outside the valve assembly 22 so that the flow path 34 is not limited by the size of the valve assembly 22 and can provide greater flow.

The valve assembly 22 includes the valve stem 38, a control element 42 coupled to a first end 44 of the stem 38, and a spring 46. The valve stem 38 and control element 42 of the valve assembly 22 are movable along the longitudinal axis X between an open position, in which the control element 42 is spaced away from a valve seat 50, and a closed position, in which the control element 42 engages the valve seat 50. The control element 42 is biased by the spring 46 toward the closed position in which the control element 42 sealingly engages the valve seat 50 to prevent fluid flow between the inlet 26 and the outlet 30. In the illustrated example, the valve assembly 22 is arranged inside a valve cage 54 and the flow path 34 is primarily disposed outside the valve assembly 22. A second end 56 of the valve stem 38, opposite the first end 44, is connected to a Scotch Yoke mechanism 60 of the actuator assembly 14. The control element 42 moves linearly with the valve stem 38 in a K direction to open the valve 10 or in the J direction to close the valve 10. While the actuator assembly 14 is described in conjunction with an axial valve, the actuator assembly 14 may be used with any other process control device, for example, linear valves, throttle valves, isolation valves, rotary valves, and/or any other process control device.

Figure 2:
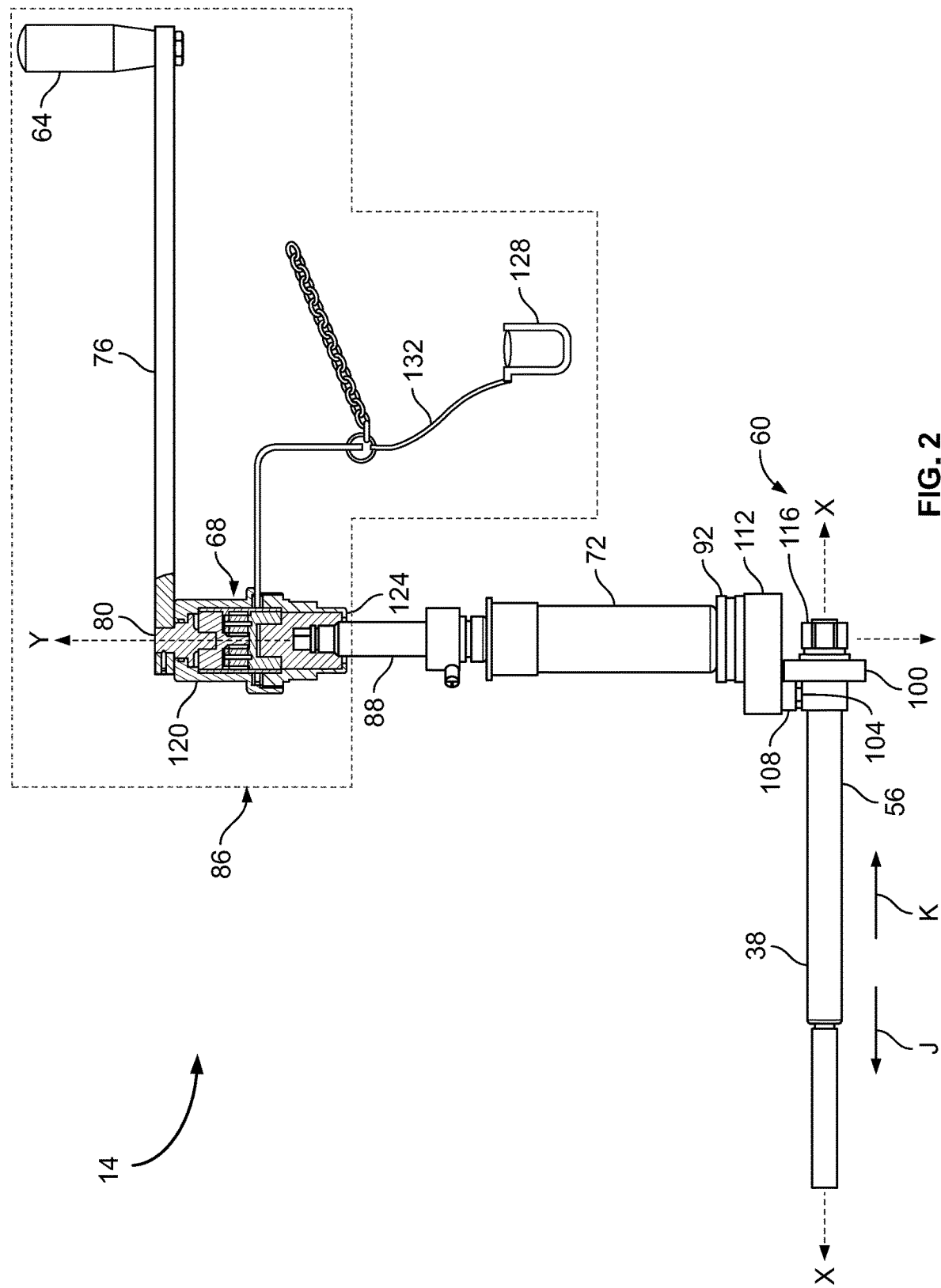
FIG. 2 is a side view of the actuator assembly and valve stem of the valve of FIG. 1 assembled in accordance with the teachings of the present disclosure.

The actuator assembly 14, shown in detail in FIG. 2, includes a manual actuation assembly 86, a transmission shaft 72, and a Scotch yoke assembly 60. The manual actuation assembly 86 includes a handle 64, a lever 76, and a transmission mechanism 68. The handle 64, which may be a rotational input device such as a knob, wheel, etc., is used to manually open the valve 10 and is connected to the transmission mechanism 68 by the lever 76. An input shaft 80, which may be part of the lever 76 or the transmission mechanism 68, receives a first rotational velocity from the lever 76 and handle 64 and delivers the first rotational velocity to the transmission mechanism 68. More specifically, the lever 76 has a square bore that receives a square end of the input shaft 80 to couple the lever 76 to the transmission mechanism 68. The transmission mechanism 68 is configured to amplify a torque that is delivered via the handle 64 to an output torque that is delivered to the transmission shaft 72. The transmission mechanism 68 is coupled to the transmission shaft 72 and delivers a second rotational velocity and, therefore, an output torque to the shaft 72, which in turn, delivers the second rotational velocity to move the control element 42 via the Scotch yoke mechanism 60. The Scotch yoke mechanism 60 is connected to the second end 56 of the valve stem 38 of the axial flow slam-shut valve 10 and converts the rotational motion of the shaft 72 to linear motion of the valve stem 38 to open (i.e., reset) the valve 10. Additionally, the transmission mechanism 68 may be configured to amplify or reduce a first torque of the handle 64 to a second toque of the transmission shaft 72.

Turning back to FIG. 1, the actuator assembly 14 includes a trigger mechanism 84 that is responsive to fluid pressure and is arranged on the outside of the valve body 18. The trigger mechanism 84 is operatively coupled to a first transmission portion 88 of the transmission shaft 72 of the actuator assembly 14. A second transmission portion 92 of the transmission shaft 72 is operatively coupled to the valve stem 38 via the Scotch yoke mechanism 60. In a first mode of operation, the trigger mechanism 84 prevents rotation of the transmission shaft 72 against the biasing force applied by the spring 46 (via the Scotch yoke mechanism 60). In a second mode of operation, the trigger mechanism 84 releases the transmission shaft 72 to allow rotation of the transmission shaft 72 under the biasing force applied by the spring 46 (via the Scotch yoke mechanism 60).

As shown in FIG. 1, the slam-shut valve 10 is in the closed position such that the control element 42 engages the seat 50 to close the valve 10. To open the valve 10 from this closed position, the handle 64, which is removable from the valve 10 and is so removed during normal operation of the valve 10, is connected to the input shaft 80 and rotated in a first direction about a longitudinal axis Y of the transmission mechanism 68. The input shaft 80 activates the transmission mechanism 68, which converts the first rotational velocity of the input shaft 80 to the second rotational velocity of the transmission shaft 72. Rotational motion of the transmission shaft 72 is converted to linear motion by the Scotch yoke mechanism 60, thereby moving the valve stem 38 and the control element 42 in a translational direction K along the longitudinal axis X of the stem 38. As such, the control element 42 moves away from the valve seat 50, opening the valve 10. The valve 10 is maintained in this open position by the trigger mechanism 84, which prevents rotation of the transmission shaft 72 when no over-pressure or under-pressure condition for which the trigger mechanism 84 has been configured is present (i.e., in a first, normal mode of operation). A relatively small torque applied via the handle 64 is multiplied via the transmission mechanism 68 into a significantly larger torque, thus making the resetting operation to open the valve 10 much less cumbersome than in known slam-shut valves.

When the valve 10 is open, fluid can flow through the openings in the cage 54 and into the flow pathway 34, and the valve 10 will be maintained in this open position absent any over-pressure or under-pressure condition for which the trigger mechanism 84 has been configured. When an over-pressure or under-pressure condition is detected by the trigger mechanism 84, the trigger mechanism 84 enables the transmission shaft 72 to rotate. By enabling the shaft 72 to rotate, the trigger mechanism 84 thus enables the stem 38 and the control element 42 to move in the direction J under the biasing force provided by the spring 46 until the control element 42 engages the seat 50. In this closed position, fluid is prevented from flowing between the inlet 26 and the outlet 30. When the over-pressure or under-pressure condition is cleared, the valve 10 can be reset (i.e., opened) via the handle 64 as described above.

In FIG. 2, the Scotch yoke mechanism 60 and the transmission shaft 72 are illustrated independent of the valve body 18 of the valve 10. As used herein, the Scotch yoke mechanism 60 is a mechanism that includes a pin that couples a sliding component (i.e., the valve stem 38) to a rotating component (i.e., the transmission shaft 72). In this example, the Scotch yoke mechanism 60 includes a plate 100, a bolt 104, a bushing 108, and a handle 112. The plate 100 is arranged on the second end 56 of the valve stem 38 and the bolt 104 is mounted to the handle 112, which is connected to the second portion 92 of the transmission shaft 72. The bushing 108 is movably arranged on the bolt 104, and is operatively coupled to the side surface of the plate 100. In the illustrated example of the Scotch yoke mechanism 60, the plate 100 is a separate part arranged at the second end 56 of the valve stem 38 and is secured to the plate 100 via a fastening member 116. However, in other examples, the plate 100 may be formed as an integral part of the valve stem 38. When the first transmission shaft 72 drives the handle 112 to rotate, the bushing 108 (arranged on the bolt 104) will drive the plate 100 linearly, thereby causing the plate 100 to move the valve stem 38 in the J or K direction.

As shown in FIG. 2, a first end 120 of the transmission mechanism 68 is coupled to the lever 76 of the handle 64 (via the input shaft 80) and a second end 124 is coupled to the first transmission portion 88 of the transmission shaft 72. A protective cap 128 is removed from the second end 124 of the transmission mechanism 68 to engage the transmission mechanism 68 with the transmission shaft 72. The cap 128 is connected to a link 132 for safekeeping and may remain attached to the transmission mechanism 68 while removed from the second end 124. The handle 64 may be removably coupled to the transmission mechanism 68 by unfastening the input shaft 80 from the lever 76. In other examples, the transmission mechanism 68 may be integrally formed with the lever 76 and handle 64 and operate as a single unit.

The transmission mechanism 68 of the actuator assembly 14 may be configured to amplify the torque applied to the handle 64 and transmit the amplified torque to the valve stem 38 of the axial valve 10 via the Scotch yoke assembly 60. The amplified torque transmitted to the valve stem 38 enables user to more easily and safely reset the axial valve 10 against the force of the spring 46 and any differential pressure that operates to oppose movement of the flow control member 42 in the K direction. In this example, the transmission mechanism 68 includes a planetary gear transmission, however, in other examples, the transmission mechanism 68 may be a different gear transmission or gearbox having a spur gear, fixed-axis gear structure, turbine worm structure, bevel gear structure, or any other suitable transmission.

Figure 3:
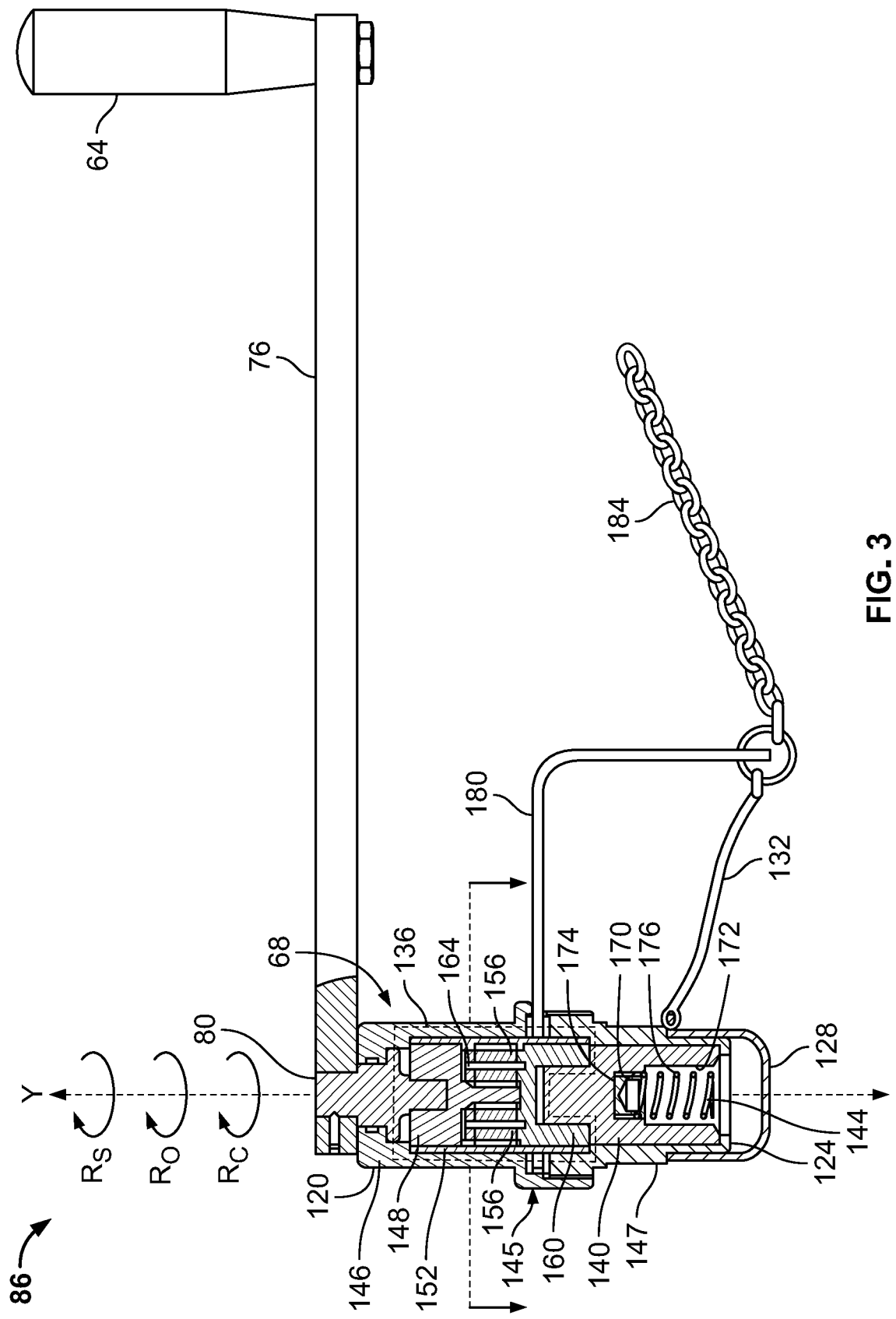
FIG. 3 is a side view of a manual actuation assembly including a transmission mechanism and handle of the actuator assembly of FIG. 2.
Figure 4:
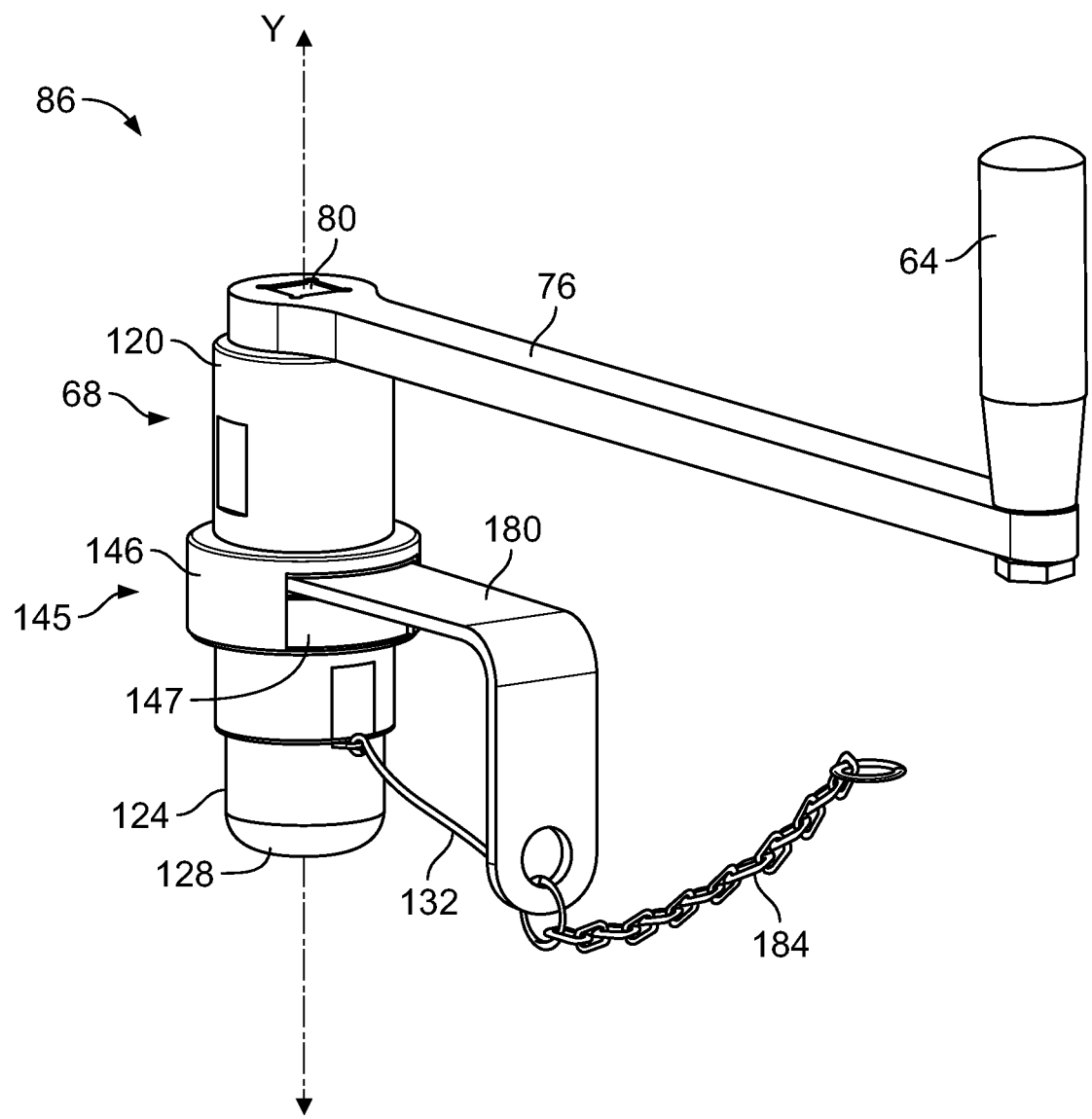
FIG. 4 is a perspective view of the manual actuation assembly of FIG. 3.

Turning now to FIGS. 3 and 4, the manual actuation assembly 86 is constructed according to the teachings of the present disclosure and includes the transmission mechanism 68, lever 76, and handle 64. The transmission mechanism 68 includes the input shaft 80, a planetary gear assembly 136, a planetary coupler 140, and a spring-release mechanism 144. The transmission mechanism 68 is disposed in a housing 145 having a top cover 146 and a bottom cover 147 that is securely fastened to the top cover 146. The planetary gear assembly 136 of the transmission mechanism 68 described herein is epicyclical and includes a central sun gear 148, a ring gear 152, a plurality of orbiting satellite gears 156 that rotate about the sun gear 148, and a planet carrier 160. The planetary gear assembly 136 includes a plurality of satellite shafts 164, and each satellite shaft 164 is coaxially aligned with a longitudinal axis $P_1$, $P_2$, $P_3$ (FIG. 5) of one of the satellite gears 156. In operation, rotation of the lever 76 about the axis Y (via the handle 64) causes the input shaft 80 to rotate in the same direction, which, in turn, causes the sun gear 148 to rotate in the same direction. Rotation of the sun gear 148 causes rotation of the satellite gears 156 via the engagement of the satellite gears 156 with the sun gear 148 and a toothed central portion of the ring gear 152 (see FIG. 5). The satellite gears 156 spin in a direction opposite the sun gear 148 but revolve in the same direction as the sun gear 148. The satellite shafts 164 couple each satellite gear 156 to the planet carrier 160, which rotates with the satellite gears 156 (in the same direction of the sun gear 148), causing the transmission shaft 72 to rotate via the planetary coupler 140.

Figure 5:
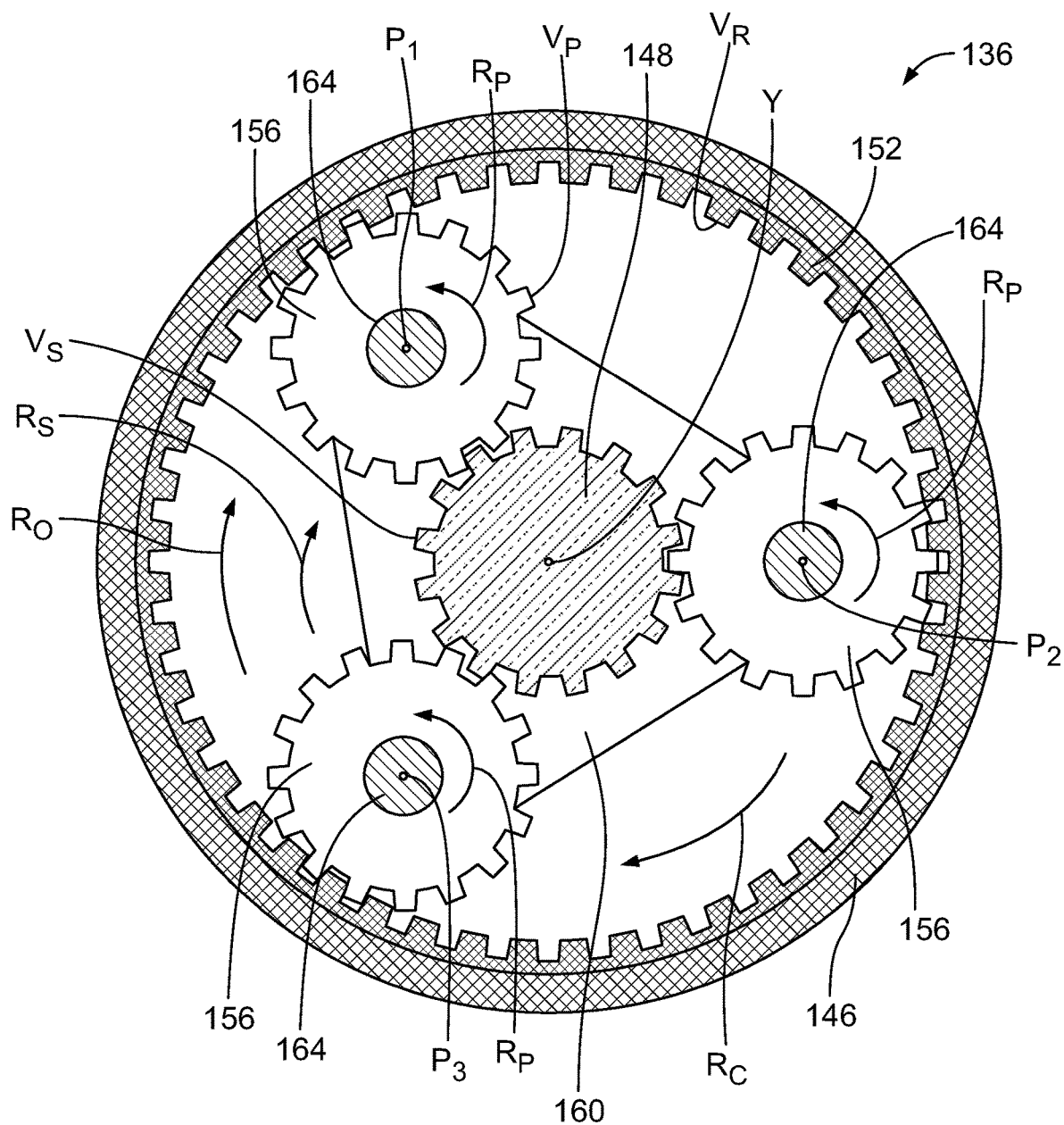
FIG. 5 is a cross-sectional view of the transmission mechanism of the actuator assembly of FIG. 2 assembled in accordance with the teachings of the present disclosure.

The planetary gear assembly 136 is shown in more detail in FIG. 5. The ring gear 152 remains stationary and is fixed between the top cover 146 and the bottom cover 147 of the transmission housing 145 of the transmission mechanism 68. The ring gear 152 has an internal surface with a top smooth portion adjacent to the sun gear 148, a middle portion including ring gear teeth $V_R$ adjacent to the satellite gears 156, and a bottom smooth portion adjacent to the planet carrier 160. The ring gear teeth $V_R$ are configured to engage with satellite gear teeth $V_P$. The satellite gear teeth $V_P$ also engage with gear teeth $V_S$ of the sun gear 148. When the planetary gear assembly 136 is activated, the sun gear 148 rotates and the satellite gears 156 revolve about the longitudinal axis Y of the transmission mechanism 68. The sun gear 148 is operatively coupled to the input shaft 80 by a rigid connection (e.g., threaded connection, square-to-square connection) such that the sun gear 148 rotates in a direction $R_S$ that matches the direction of the input rotation from the input shaft 80. As the sun gear 148 rotates in the $R_S$ direction, the gear teeth $V_S$ of the sun gear 148 engage the gear teeth $V_P$ of the satellite gears 156, causing each of the satellite gears 156 to rotate about each respective axis $P_1$, $P_2$, and P$_3$ in an opposite rotational direction R$_P$. At the same time, the satellite gears 156 revolve around the sun gear 148 in a R$_O$ direction. As the satellite gears 156 revolve in the R$_O$ direction, each shaft 164 of the satellite gears 156 move in the R$_O$ direction, as well. The satellite shafts 164 are coupled to the planet carrier 160 by a fixed connection (e.g., threaded connection, square-to-square connection), thereby rotating the planet carrier 160 in a direction R$_C$. The planet carrier 160, which is coupled to the transmission shaft 72 of FIG. 1, causes the transmission shaft 72 to rotate in the R$_C$ direction. Each rotation of the sun gear 148 results in a partial revolution of the satellite gears 156 about the sun gear 148; thus, the output rotational velocity is less than the input rotational velocity. Because the force applied to the sun gear 148 is transferred to a larger radius (i.e., the distance between the Y axis and any of the axes P$_1$, P$_2$, P$_3$, etc. of the satellite gears 156), the output torque is greater than the input torque.

In the illustrated example, the planetary gear assembly 136 includes three satellite gears 156. However, in other examples, the planetary gear assembly 136 may any number of two or more satellite gears 156 orbiting the sun gear 148. The orbiting satellite gears 156 are roughly the same size relative to the sun gear 148. In other examples, the geometric relationship between the satellite gears 156 and the sun gear 148 may differ to achieve a desired torque amplification and speed reduction. The planetary gear assembly 136 is a single stage planetary gear transmission in which the input torque and rotational velocity of the handle 64 are converted in one stage to a higher output torque and a lower output rotational velocity. Other embodiments may include a multiple-stage planetary gear transmission that may magnify the input torque and decrease input rotational speed to varying degrees, which may be controlled by a user by activating or deactivating one or more stages.

The manual actuation assembly 86 described herein is configured to increase the torque that is delivered to the actuator assembly 22 in a compact device. The gear ratios of the satellite gears 156, the sun gear 148, and ring gear 152 are determined to achieve a desired torque amplification.

Turning back to FIG. 3, the planet coupler 140 is operatively coupled to the planet carrier 160 by a fixed connection (e.g., threaded connection, square-to-square connection), and is free to spin within the bottom cover 147 of the transmission housing 145 when the planetary gear assembly 136 is activated. While the illustrated example shows a planetary coupler 140 that is coupled to and separate from the planet carrier 160, in an alternate example, the functionality of the planet carrier 160 and the planet coupler 140 may be combined into a single component. At an opposite end of the planet carrier 160, the planet coupler 140 is operatively coupled to the spring-release mechanism 144. More particularly, the coupler 140 includes a first bore 170 extending into a wider second bore 172. The first bore 170 is inserted over the first portion 88 of the transmission shaft 72 to reset the valve 10. The coupling of the planet coupler 140 with the transmission shaft 72, which may be accomplished, for example, via a square bore 170 that receives a corresponding square first portion 88, results in the rotation of the transmission shaft 72.

An expandable bushing 174 is disposed in the first bore 170 and positions a spring 176 that extends through the first and second bores 170, 172. Together, the spring 176 and the bushing 174 form the spring-release mechanism 144 that is configured to cause the coupler 140 to disengage the first portion 88 of the transmission shaft 72 unless the transmission mechanism 68 is securely held onto the first portion 88 of the transmission shaft 72 by the operator during use. If the connection between the transmission shaft 72 and the manual actuation assembly 86 is not secure (e.g., the handle 64 slips from an operator's grip), the spring-release mechanism 144 causes the coupler 140 to disengage from the transmission shaft 72. Specifically, the spring 176 ejects the transmission shaft 72 from the bore 172 of the coupler 140 when bore 172 is not firmly maintained on the transmission shaft 72.

The operation of the spring-release mechanism 144 improves safety as it enables an operator to release the manual actuation assembly 86 to cause automatic disengagement of the transmission mechanism 68 from the transmission shaft 72 during a reset operation if a condition arises that makes it unsafe to continue the reset operation. For example, if the operator's grip slips from the handle 64, the operator can let go of the manual actuation assembly 86 to cause disengagement of the transmission shaft 72 and avoid dangerous reverse rotation of the lever 76 under the force of the spring 176. The spring-release mechanism 144 further ensures that the transmission mechanism 68 is automatically disengaged from the transmission shaft 72 when a reset operation is complete. If the transmission mechanism 68 was not disengaged from the transmission shaft 72 following a reset operation, the lever 76 would dangerously rotate when the trigger mechanism 84 caused the valve 10 to close.

Figure 6:
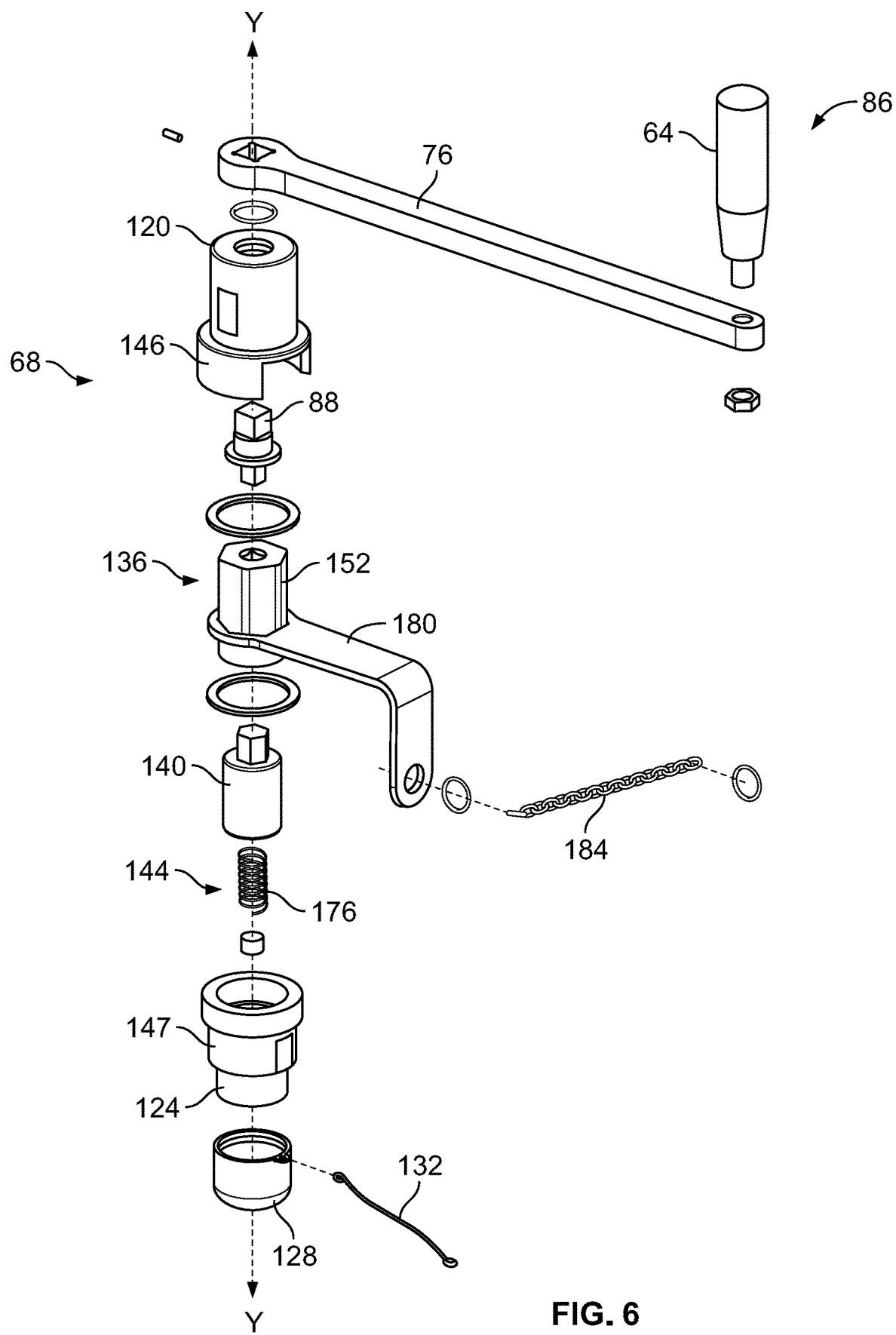
FIG. 6 is an exploded view of the manual actuation assembly of FIG. 3.
Figure 7:
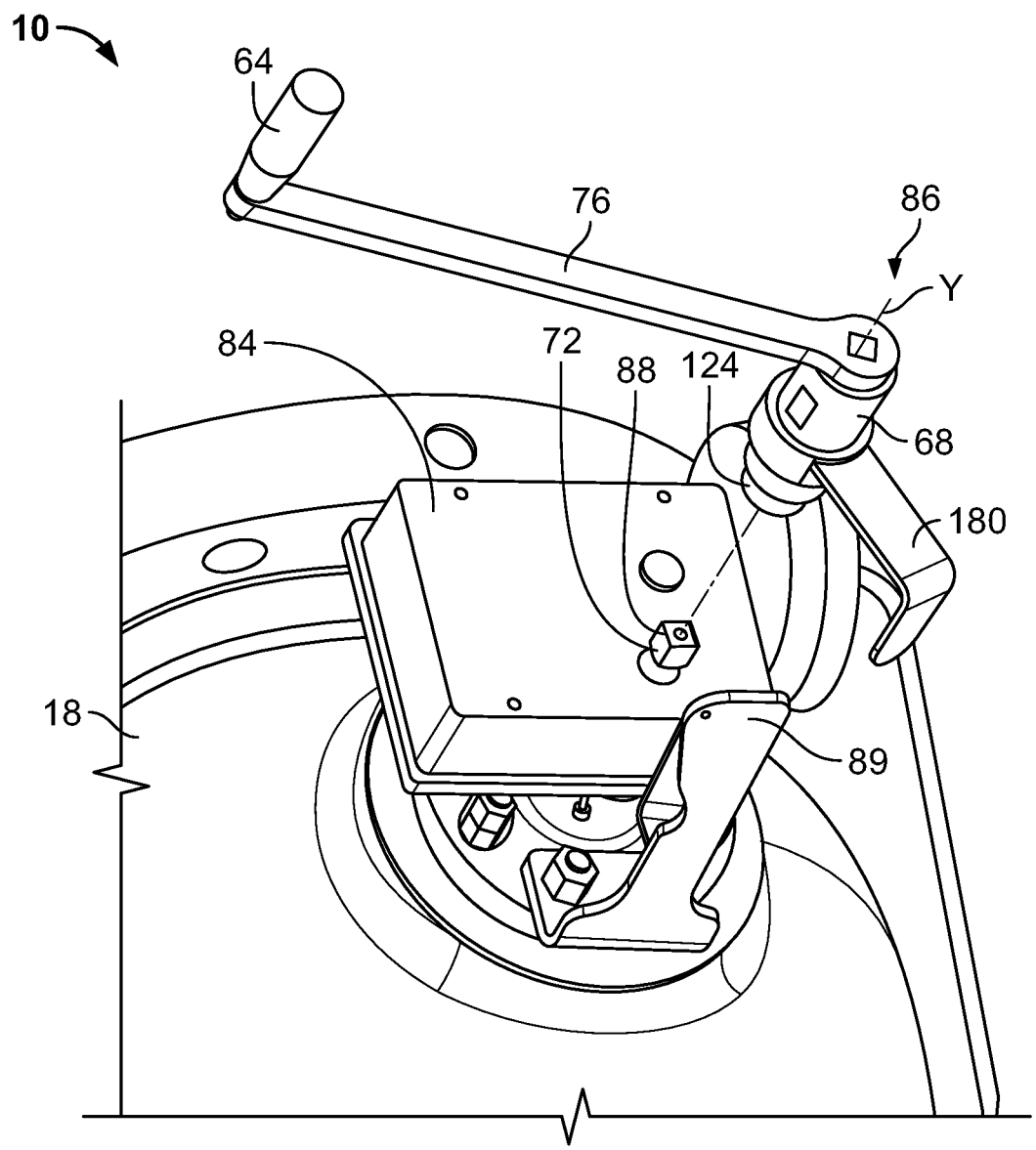
FIG. 7 is a perspective view of the manual actuation assembly of FIG. 3 aligned for connection with a valve assembled in accordance with the teachings of the present disclosure.

As shown in FIGS. 3 and 4, the removable cap 128 is coupled to the bottom cover 147 of the transmission housing 145, thereby protecting the spring-release mechanism 144. The cap 128 is removed from the bottom cover 147 to enable insertion of the first portion 88 of the transmission shaft 72 in the bore 170. For convenience, the cap 128 is connected to a support frame 180 that is secured to the transmission mechanism 68 between the top and bottom covers 146, 147 of the housing 145. As shown in FIGS. 6 and 7, the support frame 180 is positioned about an exterior surface of the ring gear 152, which exterior surface has a shape (e.g., a rectangular shape, a square shape, a hexagonal shape, etc.) that corresponds to the shape of a bore in the support frame 180 and ensures that the support frame 180 and the ring gear 152 are rotationally coupled. The support frame 180 is maintained in position along the longitudinal axis Y by virtue of being clamped between the top and bottom covers 146, 147, which are threadably coupled to each other. The support frame 180 is shaped to engage a bracket 89 (see FIGS. 1 and 7) that is coupled to the valve body 18. Engagement of the support frame 180 with the bracket 89 creates a reactionary force that maintains the ring gear 152 in a stationary position while the operator rotates the lever 76 relative to the ring gear 152. While the support frame 180 is described and illustrated as being engageable with the bracket 89, in other examples, the support frame 180 may be shaped to engage other portions of the actuator assembly 14 or the valve 10 to provide the same reactionary force functionality.

FIG. 7 illustrates the manual actuation assembly 86 of FIGS. 3-6 in alignment with the first portion 88 of the transmission shaft 72 at least partially disposed in a valve, such as the valve 10 of FIG. 1. The manual actuation assembly 86 is completely removable from the valve 10 and may be rotatably coupled to the transmission shaft 72 of the actuator assembly 14 disposed in the valve body 18 by aligning the bore 172 of the second end 124 of the transmission mechanism 68 with the first portion 88 of the transmission shaft 72.

Figure 8:
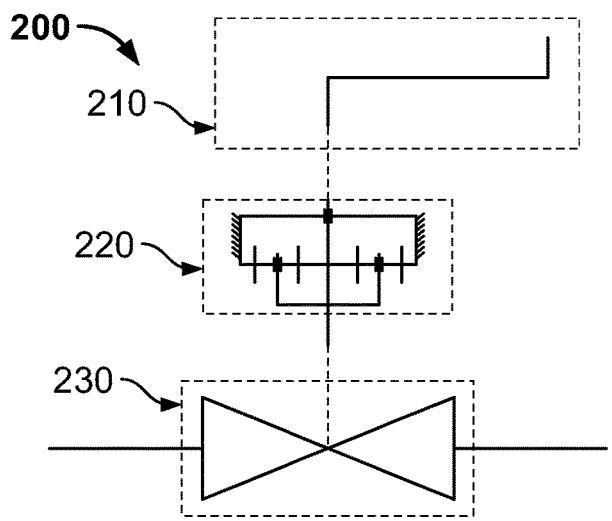
FIG. 8 is a schematic diagram of a first exemplary valve system with the transmission mechanism of FIG. 3 assembled in accordance with the teachings of the present disclosure.
Figure 9:
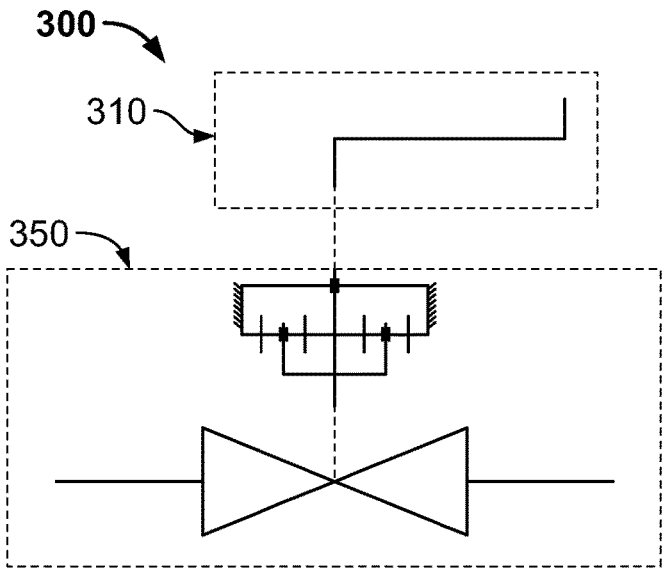
FIG. 9 is a schematic diagram of a second exemplary valve system with the transmission mechanism of FIG. 3 assembled in accordance with the teachings of the present disclosure.
Figure 10:
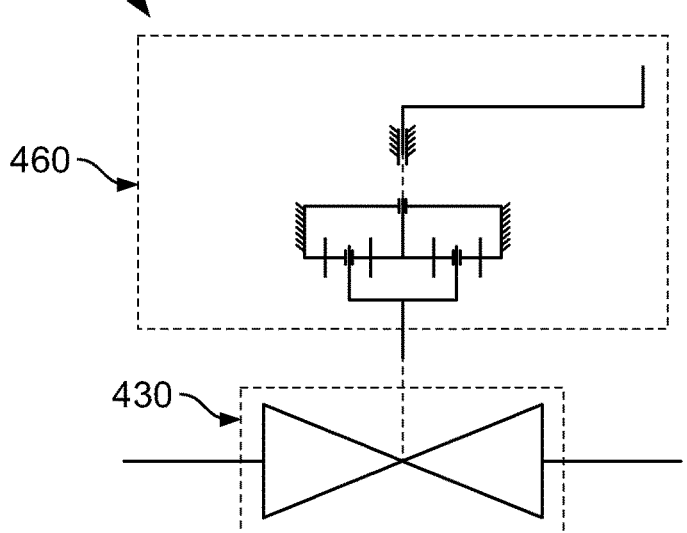
FIG. 10 is a schematic diagram of a third exemplary valve system with the transmission mechanism of FIG. 3 assembled in accordance with the teachings of the present disclosure.

In FIGS. 8-10, first, second, and third exemplary valve systems 200, 300, 400 incorporate different configurations of a valve and the actuator assembly 14 of FIGS. 1-3, and are constructed in accordance with the teachings of the present disclosure. In FIG. 8, the first exemplary valve system 200 is a modular system having a separate handle 210, transmission mechanism 220, and control valve 230. Each component is separately constructed and then attached for operation. In this case, both the transmission mechanism 220 and the handle 210 are at least partially disposed outside of a valve body of the valve 230. The valve 230 in this example may be an axial flow valve, such as the control valve 10 of FIG. 1. In FIG. 9, the second exemplary valve system 300 includes a handle 310 and a control valve with an integrated transmission mechanism 350. In this example, the handle 310 may be attached to the integrated valve to activate the transmission mechanism, which may be at least partially disposed within the valve body. Finally, FIG. 10 illustrates the third exemplary valve system 400. In this configuration, a manual actuation assembly 460 includes a handle integrated with a transmission mechanism. The manual actuation assembly 460 is separable from a valve 430. This schematic system 400 may represent the manual actuation assembly 86 of FIGS. 1-7.

In the present disclosure, the actuator assembly 14, the transmission mechanism 68, and Scotch yoke mechanism 60 adopt a modular design, which is easy to install and maintain. Standardized, generalized or serialized components can be used in the transmission mechanism 68 and Scotch yoke mechanism 60, which are easy to produce with a lower cost. Further, the planetary gear assembly 136 provides a lightweight torque amplifying means that provides a high bearing capacity with an overall compact structure. The transmission mechanism 68 advantageously enables sufficient torque to be generated to safely reset the valve 10 without increasing the length of the lever 76 or requiring substantial (and potentially unsafe) manual force. In alternate embodiments, the lever 76 may be replaced with a hand wheel. While the manual actuation assembly 86 has been described in the context of its use in association with a slam-shut valve 10, the manual actuation assembly 86 might be used to provide torque amplification in a compact design for any type of rotational actuation of a fluid control device (e.g., butterfly valve, ball valve, etc.).

Additionally, the manual actuation assembly 86 beneficially provides a fail-safe spring-release mechanism 144 to prevent injury to operators. For example, during the manual reset of known valves, the reversing force of the handle may cause injury to the operators and further may affect the functionality of the valve. However, in the disclosed examples, when the manual actuation assembly 86 is released by the operator, the spring-release mechanism 144 pushes the handle 64 and transmission mechanism 68 out of engagement with the rest of the actuator assembly 14, thus protecting the operator from injury and the valve 10 from further malfunction.

The figures and description provided herein depict and describe preferred embodiments of an axial regulator for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs for the axial regulator. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A manual actuation assembly for a fluid control device, comprising:
    a coupling including a cavity that is configured to receive a shaft of the fluid control device;
    a biasing member positioned within the cavity;
    a rotatable input device; and
    a transmission section that is configured to operably couple the rotatable input device and the coupling such that rotation of the rotatable input device causes rotation of the shaft, wherein the transmission section comprises:
    a sun gear that is configured to rotate in conjunction with rotation of the rotatable input device; and
    a plurality of satellite gears that are each configured to revolve around the sun gear, wherein the coupling is operably coupled to the plurality of satellite gears.

2. The manual actuation assembly of claim 1, wherein the transmission section further comprises a planet carrier that is coupled to each of the plurality of satellite gears.

3. The manual actuation assembly of claim 2, wherein the planet carrier is coupled to the coupling.

4. The manual actuation assembly of claim 1, wherein the biasing member is configured to decouple the coupling and the shaft when no external force is applied to maintain the shaft within the cavity.

5. The manual actuation assembly of claim 1, further comprising a ring gear, wherein each of the plurality of satellite gears is engaged with the sun gear and the ring gear.

6. The manual actuation assembly of claim 5, further comprising a support frame that engages an exterior surface of the ring gear, wherein the support frame is configured to enable rotation of the input member while the ring gear is stationary.

7. The manual actuation assembly of claim 1, further comprising an input shaft that is coupled to the rotatable input device and to the sun gear.

8. A manual actuation assembly for a fluid control device, comprising:
    a rotatable handle that is operably coupled to a sun gear;
    a plurality of satellite gears that are configured to revolve about the sun gear;
    a planet carrier that is coupled to each of the plurality of satellite gears; and
    a coupling that is coupled to the planet carrier, wherein the coupling comprises a cavity that is configured to receive a shaft of the fluid control device, and wherein a biasing member is positioned within the cavity to bias the shaft out of the cavity absent a force to maintain the shaft within the cavity.

9. The manual actuation assembly of claim 8, further comprising an input shaft that is coupled to the rotatable handle and the sun gear.

10. The manual actuation assembly of claim 9, further comprising a ring gear, wherein each of the plurality of satellite gears is configured to engage the sun gear and the ring gear.

11. The manual actuation assembly of claim 8, further comprising a support frame having a bore that is configured to receive an exterior surface of the ring gear, wherein the support frame is configured to facilitate rotation of the rotatable handle relative to the ring gear.

12. The manual actuation assembly of claim 11, wherein an output torque that is delivered at the coupling is greater than an input torque that is delivered via rotation of the rotatable handle.

13. An actuator assembly comprising:
- a transmission mechanism configured to receive a first rotational velocity and to deliver a second rotational velocity different than the first rotational velocity, the transmission mechanism including a planetary clear assembly including a sun clear, a plurality of satellites, a plurality of satellite shafts, and a rind clear,
- a shaft having a first end coupled to the transmission mechanism and a second end operatively coupled to a stem; and
- a Scotch yoke mechanism operatively coupled to the stem and the transmission mechanism via the second end of shaft, the Scotch yoke mechanism configured to receive the second rotational velocity and cause movement of the stem and a control element along a first axis in a translational directions;
- a coupler assembly including a coupler having a first end operatively coupled to the plurality of satellite shafts and a second end that houses a spring-release mechanism, the spring-release mechanism removably coupled to the first end of the shaft;
- wherein the sun gear is operatively coupled to the shaft and receives the first rotational velocity and delivers the second rotational velocity to the satellite shafts via the satellites.

14. The actuator assembly of claim 13, wherein the transmission mechanism includes a planet carrier coupled to the plurality of satellite shafts, the planet carrier operatively coupled to the shaft.

15. The actuator assembly of claim 13, wherein the spring-release mechanism includes an expandable bushing and a spring, the spring-release mechanism engages the shaft when the shaft is coupled to the transmission mechanism and disengages the shaft when the shaft is decoupled from the transmission mechanism.

16. The actuator assembly of claim 13, wherein the actuator assembly is coupled to a fluid control device, comprising:
- a body having an inlet, an outlet, and a fluid flow path between the inlet and the outlet;
- a seat; and
- the control element that is coupled to the stem, wherein the control element and the stem are movable along the first axis and biased toward a closed position, in which the control element engages the seat.

* * * * *

UNITED STATES PATENT AND TRADEMARK OFFICE
CERTIFICATE OF CORRECTION

PATENT NO. : 11,326,713 B2
APPLICATION NO. : 16/906624
DATED : May 10, 2022
INVENTOR(S) : Jian Yan et al.

It is certified that error appears in the above-identified patent and that said Letters Patent is hereby corrected as shown below:

In the Specification

At Column 4, Line 42, "that may" should be -- may --.

At Column 6, Line 39, "toque" should be -- torque --.

At Column 8, Line 43, "of" should be -- as --.

In the Claims

At Column 13, Line 9, "clear" should be -- gear --.

At Column 13, Line 10, "clear," should be -- gear, --.

At Column 13, Line 11, "rind clear," should be -- ring gear; --.

At Column 13, Line 14, "; and" should be -- ; --.

At Column 13, Line 20, "directions;" should be -- direction; --.

Signed and Sealed this
Twenty-sixth Day of September, 2023

Katherine Kelly Vidal
*Director of the United States Patent and Trademark Office*